United States Patent
Larkin

(10) Patent No.: US 6,306,215 B1
(45) Date of Patent: *Oct. 23, 2001

(54) APPARATUS FOR COATING CURRENT COLLECTORS

(75) Inventor: James T. Larkin, Colorado Springs, CO (US)

(73) Assignee: Valence Technology, Inc., Henderson, NV (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/041,083

(22) Filed: Mar. 10, 1998

(51) Int. Cl.$^7$ ....................................................... B05C 1/04
(52) U.S. Cl. .......................... 118/249; 118/256; 118/261
(58) Field of Search ............................... 118/249, 256, 118/259, 261; 427/207.1, 428, 58; 29/623.1, 623.4, 623.5; 156/244.23, 244.26, 314, 578

(56) References Cited

U.S. PATENT DOCUMENTS

| | | | |
|---|---|---|---|
| 3,762,365 | * | 10/1973 | Herzog .................................. 118/249 |
| 3,866,569 | * | 2/1975 | Gibson et al. ........................ 118/249 |
| 4,471,714 | | 9/1984 | Esser .................................... 118/126 |
| 4,584,962 | * | 4/1986 | Cartmell .............................. 118/249 |
| 4,603,060 | * | 7/1986 | Mitsuda et al. ...................... 118/249 |
| 4,928,622 | | 5/1990 | Larsson et al. ........................ 118/70 |
| 5,316,556 | | 5/1994 | Morris . | 
| 5,346,385 | | 9/1994 | McAleavey . |
| 5,464,707 | | 11/1995 | Moulton et al. . |
| 5,795,357 | * | 8/1998 | Kim .................................... 118/249 |

FOREIGN PATENT DOCUMENTS 2213406A  8/1989  (GB) .

OTHER PUBLICATIONS

Patent Abstracts of Japan, publication No. 63261675, published Oct. 28, 1988.
Patent Abstracts of Japan, publication No. 09099269, published Apr. 15, 1997.

* cited by examiner

*Primary Examiner*—Laura Edwards
(74) *Attorney, Agent, or Firm*—Harness, Dickey & Pierce

(57) ABSTRACT

Apparatus and process for continuously coating a web of current collectors with an electrically conductive adhesive material for electrochemical cells and batteries. The apparatus includes: (a) a source of the web of current collector material; (b) a reservoir containing the liquid composition; (c) a first rotatable roller having an exterior surface that is at least partially submerged in the liquid composition whereby liquid composition adheres to the exterior surface of the first rotatable roller which comes into contact with the liquid composition; and (d) a second rotatable roller that is positioned adjacent to the first rotatable roller and wherein an exterior surface of the second rotatable roller and an exterior surface of the first rotatable roller defines a nip through which the web of current collector material traverses.

12 Claims, 1 Drawing Sheet

APPARATUS FOR COATING CURRENT COLLECTORS

FIELD OF THE INVENTION

The present invention relates to electrochemical devices and, more particularly, to an apparatus and method for coating current collectors employed in non-aqueous electrochemical cells.

BACKGROUND OF THE INVENTION

Non-aqueous lithium electrochemical cells typically include an anode, a lithium electrolyte prepared from a lithium salt dissolved in one or more organic solvents and a cathode of an electrochemically active material, typically a chalcogenide of a transition metal. During discharge, lithium ions from the anode pass through the liquid electrolyte to the electrochemically active material of the cathode where the ions are taken up with the simultaneous release of electrical energy. During charging, the flow of ions is reversed so that lithium ions pass from the electrochemically active cathode material through the electrolyte and are plated back onto the lithium anode. Non-aqueous lithium electrochemical cells are discussed in U.S. Pat. Nos. 4,472,487, 4,668,595, 5,028,500, 5,441,830, 5,460,904, 5,540,741, and 5,584,893.

Recently, the lithium metal anode has been replaced with a carbon anode such as coke or graphite intercalated with lithium ions to form $Li_xC$. In operation of the cell, lithium passes from the carbon through the electrolyte to the cathode where it is taken up just as in a cell with a metallic lithium anode. During recharge, the lithium is transferred back to the anode where it reintercalates into the carbon. Because no metallic lithium is present in the cell, melting of the anode does not occur even under abuse conditions. Also, because lithium is reincorporated into the anode by intercalation rather than by plating, dendritic and spongy lithium growth does not occur.

Laminate cells and batteries have been developed which possess good performance characteristics. Typically, a laminate cell includes composite electrodes which refer to cathodes and anodes wherein the cathode is comprised of materials other than compatible cathodic materials and the anode is comprised of materials other than compatible anodic materials. Typically, the composite electrodes contains a polymer which acts to bind the composite materials together and an electrolytic solvent. Composite electrodes are well known in the art. For example, a composite cathode can comprise a compatible cathodic material, a conductive material, an electrolytic solvent, an alkali salt, and a solid matrix forming polymer. Similarly, for example, a composite anode can comprise a compatible intercalation anodic material, an electrolytic solvent and a solid matrix forming polymer.

In order to enhance the overall current produced by solid or liquid batteries, it is conventional to employ several electrochemical cells in a battery. When so employed, the current from each of the cells is accumulated so that the total current generated by the battery is roughly the sum of the current generated from each of the individual electrochemical cells employed in the battery. One method for accumulating the current from individual electrochemical cells is by using a current collector attached to the cathode or the anode of the electrochemical cell. Typically, the current collector is a metal foil or a conductive plastic which is coupled to other current collectors in the battery so that the current generated by each cell is collected and accumulated over all of the cells. Thus, the total current generated by the battery is a summation of the current generated by each of the electrochemical cells employed in the battery minus whatever current is lost due to resistance in the current collector. Current collectors are described, for example, in U.S. Pat. Nos. 4,925,752, 5,011,501, and 5,441,830. Notwithstanding the benefits of using current collectors in electrochemical cells, metal foil current collectors often do not adhere to the surface of composite electrodes. This inevitably reduces the electrochemical performance of the electrochemical cell and battery. U.S. Pat. No. 5,464,707 describes the use of an adhesion promoting layer that is applied onto the surface of a current collector. Thereafter, a cathode paste comprising monomers and/or prepolymers is coated onto the adhesion layer. Upon curing the monomers and/or prepolymers of the cathode paste, the cathode material becomes attached to the collector.

SUMMARY OF THE INVENTION

The invention is directed to an apparatus and efficient method of continuously coating a web of current collector with an adhesion material in the process of making electrochemical cells and batteries. Electrochemical cells are batteries produced by the inventive method are expected to exhibit high reactivity, good charge rate capabilities, life cycle, specific rate and stability.

In one aspect, the invention is directed to an apparatus for continuously coating a liquid adhesive promoter composition onto a surface of a web of current collector material which includes:

a source of the web of current collector material;

a reservoir containing the liquid composition;

a first rotatable roller having an exterior surface that is at least partially submerged in the liquid composition whereby liquid composition adheres to the exterior surface of the first rotatable roller that comes into contact with the liquid composition; and a second rotatable roller that is positioned adjacent to the first rotatable roller and wherein an exterior surface of the second rotatable roller and an exterior surface of the first rotatable roller defines a nip through which the web of current collector material traverses.

In another aspect, the invention is directed to a method of continuously coating a liquid adhesion promoter composition that includes the steps of:

(a) providing a coating apparatus that includes:

(i) a source of the web of current collector material;

(ii) a reservoir containing the liquid composition;

(ii) a first rotatable roller having an exterior surface that is at least partially submerged in the liquid composition whereby liquid composition adheres to the exterior surface of the first rotatable roller that comes into contact with the liquid composition; and (iv) a second rotatable roller that is positioned adjacent to the first rotatable roller and wherein an exterior surface of the second rotatable roller and an exterior surface of the first rotatable roller defines a nip through which the web of current collector material traverses;

(b) rotating the first rotatable roller to cause liquid composition to adhere to the exterior surface of the first roller; and (c) rotating the second roller to cause at least a portion of the liquid composition from the exterior surface of the first roller to be transferred and coated onto a surface of the web.

In yet another aspect, the invention is directed to a method of preparing an electrode/current collector assembly that includes the steps of:

(a) providing a coating apparatus that includes:
  (i) a source of a web of current collector material;
  (ii) a reservoir containing the liquid composition;
  (ii) a first rotatable roller having an exterior surface that is at least partially submerged in the liquid composition whereby liquid composition adheres to the exterior surface of the first rotatable roller that comes into contact with the liquid composition; and
  (iv) a second rotatable roller that is positioned adjacent to the first rotatable roller and wherein an exterior surface of the second rotatable roller and an exterior surface of the first rotatable roller defines a nip through which the web of current collector material traverses.

(b) rotating the first rotatable roller to cause liquid composition to adhere to the exterior surface of the first roller;

(c) rotating the second roller to cause at least a portion of the liquid composition from the exterior surface of the first roller to be transferred and coated onto a surface of the web to form a layer of electrically conductive promoter thereon;

(d) applying an electrode layer comprising a mixture comprising a solvent, a polymeric binder, and an anodic material or cathodic material onto the layer of electrically conductive adhesion promoter; and (e) removing said solvent from the electrode layer to form a composite electrode that is attached to said layer of electrically conductive adhesion promoter, wherein the composite electrode is selected from the group consisting of a composite cathode and a composite anode, wherein the thickness of said electrically conductive adhesive promoter is sufficient to bind the composite electrode to said current collector, and wherein no curing to polymerize the polymeric binder is required subsequent to applying the electrode layer onto the layer of electrically conductive adhesion promoter.

DETAILED DESCRIPTION OF THE PREFERRED EMBODIMENTS OF THE INVENTION

Figure 1:
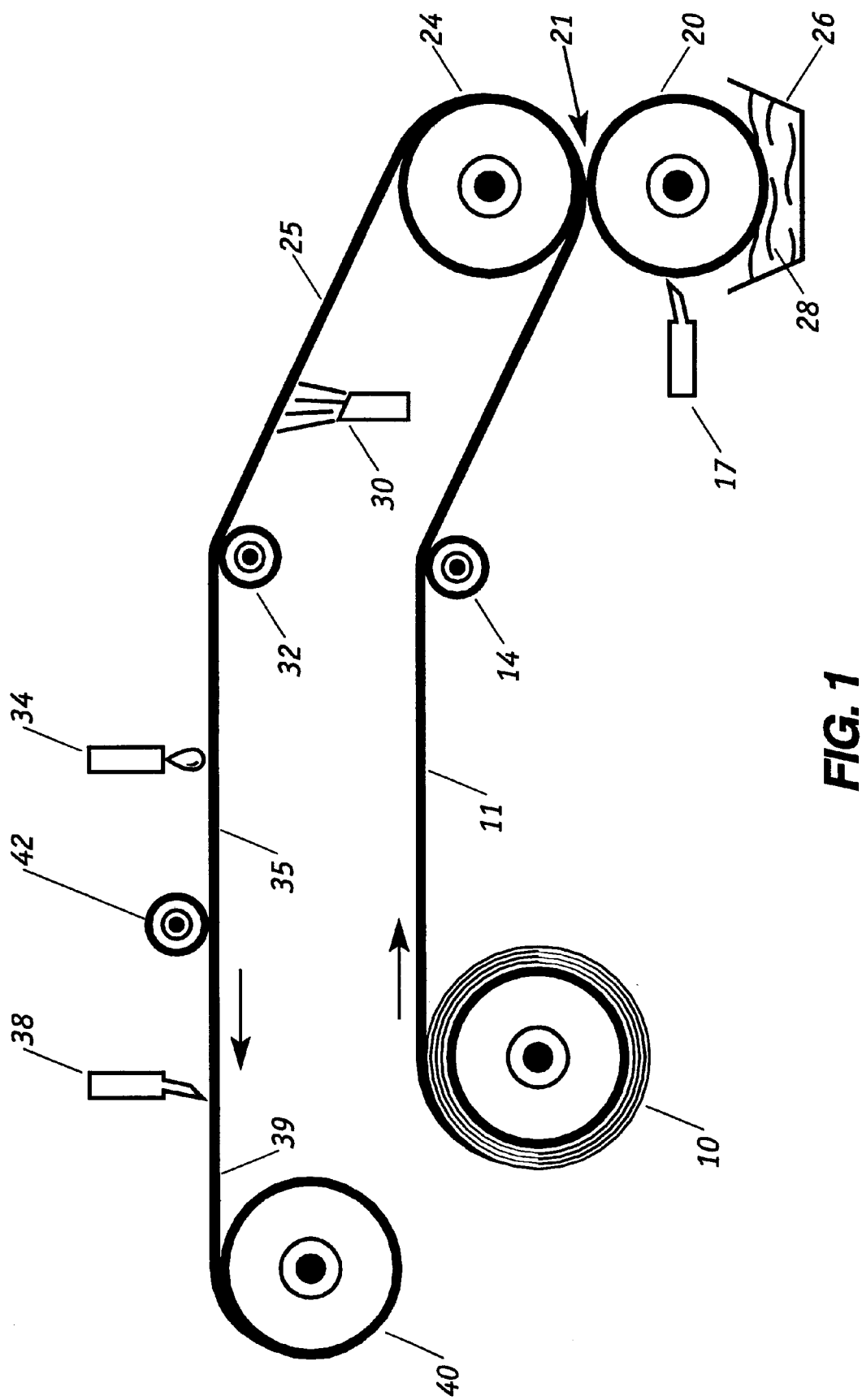
FIG. 1 is a schematic side view of an apparatus for coating a current collector.

The present invention is directed to a method of fabricating electrochemical cells or precursors thereof wherein current collectors are coated with an electrically conductive adhesion promoter material. Preferred electrochemical cells include: a composite cathode comprising an active material and a polymeric binder, a composite anode comprising an intercalation based carbon anode, with each electrode capable of reversibly incorporating (e.g., intercalating ) an alkali metal ion, and a polymeric matrix containing an electrolyte solution comprising an organic electrolyte solvent and a salt of the alkali metal. At least one of the composite electrodes has a current collector that is coated with a layer of an electrically conductive adhesion promoter that is positioned between the composite electrode and current collector. Preferably both composite electrodes are so constructed. The electrically conductive adhesion promoter layer significantly improves the adhesion of the current collector to the composite electrode which results in a reduction in the impedance for the electrochemical cell and battery. Particularly preferred electrochemical cells and batteries use lithium and salts thereof. Although solid electrochemical cells are preferred, the invention is also applicable to liquid electrochemical cells wherein the electrolyte comprises a separator (e.g., glass fiber, polyethylene or polypropylene) and an electrolyte solution.

The anode of the present invention generally comprises an anode film that is laminated onto one or both sides of the current collector. Typically, each anode film is from about 100 $\mu$m to about 250 $\mu$m in thickness, preferably about 110 $\mu$m to about 200 $\mu$m and more preferably about 125 $\mu$m to about 175 $\mu$m.

Similarly, the cathode of the present invention generally comprises a cathode film that is laminated onto one or both sides of the current collector. Typically, each cathode film is from about 100 $\mu$m to about 200 $\mu$m in thickness, preferably about 130 $\mu$m to about 175 $\mu$m and more preferably about 140 $\mu$m to about 165 $\mu$m.

The current collectors comprise, for example, a screen, grid, expanded metal, foil, woven or non-woven fabric or knitted wire formed from an electron conductive material such as metals or alloys. Preferably, the current collector has a thickness from about 25 $\mu$m to about 75 $\mu$m, preferably about 35 $\mu$m to about 65 $\mu$m, and more preferably about 45 $\mu$m to about 55 $\mu$m. Each current collector is also connected to a current collector tab which extends from the edge of the current collector. In batteries comprising multiple electrochemical cells, the anode tabs are preferably welded together and connected to a nickel lead. The cathode tabs are similarly welded and connected to a lead. External loads can be electrically connected to the leads. Current collectors and tabs are described in U.S. Pat. Nos. 4,925,752, 5,011,501 and 5,326,653, which are incorporated herein.

A critical feature of the invention is that the current collector is coated with a layer of electrically conductive adhesion promoter which preferably is a composition that comprises an adhesion polymer and an electrically conductive material. The adhesion polymer serves to adhere the current collector surface to the composite electrode. Electrically conductive adhesion promoters are described, for example, in U.S. Pat. No. 5,464,707 which is incorporated herein. Preferred adhesion polymers include, for example, (1) acrylics including acrylic and methacrylic acids and esters, (2) vinyls including poly(vinyl acetate), (3) polyesters, (4) polyurethanes, (5) fluoroelastomers, and mixtures thereof. A preferred polyester is poly(adipic acid-co-ethylene glycol); a preferred polyurethane is poly(poly(oxypropylene)-co-toluene diisocyanate and a preferred fluoroelastomer comprise a two-part adhesive of poly(vinylidene fluoride-cohexafluoropropylene) and ketenes. Preferably, the adhesion polymer has a molecular weight of at least about 10,000.

Preferred electrically conductive materials include, for example, conductive carbons including graphite powders and hollow carbon fibers, ultrafine metal powders which preferably have diameters of about 15 $\mu$m or less, preferably from about 5 $\mu$m to about 30 $\mu$m, highly conjugated polymers such a BLACK ORLON which is produced by simultaneous cyclization and oxidation of at 160°–300° C. of polyacrylonitrile, and polyacetylene, metal coated carbon fibers, metal coated polymeric fibers, indium tin oxide, buckminster fullerenes, and mixtures thereof. Preferred conjugated polymers also include, for example, poly(thiophene) and poly(diacetylenes).

The relative amounts of adhesion polymer and electrically conductive material in the adhesion layer are selected to achieve adequate adhesion of the current collector of the composite electrode and sufficient electrical conductivity. The liquid adhesion promoter composition includes a suitable solvent (e.g., organic), electrically conductive material, and adhesive polymer. Preferably, following removal of the solvent, the percentage of electrically conductive materials present in the electrically conductive adhesive layer ranges from about 10% to about 40%; more preferably from about 15% to about 25%, on a weight basis. Similarly, the thickness of the electrically conductive adhesion promoter layer is selected to achieve adequate adhesion of the current collector of the composite electrode and sufficient electrical conductivity. Preferably the coat weight of this layer is from about $4\times10^{-5}$ g/cm$^2$ to about $4\times10^{-3}$ g/cm$^2$; more preferably from about $1\times10^{-4}$ g/cm$^2$ to about $1\times10^{-3}$ g/cm$^2$; most preferably from about $1\times10^{-4}$ g/cm$^2$ to about $6\times10^{-4}$ g/cm$^2$.

The choice of adhesion polymer(s) and electrically conductive material(s) will depend, in part, on the other components employed in fabricating the composite electrode and electrolyte. For example, these materials must be compatible with the extraction solvent used to remove the plasticizer. In particular, adhesion polymer should be essentially insoluble in the organic extraction solvents.

The layer of adhesion promoter is prepared by first forming a mixture comprising a solvent, the adhesion polymer, and the electrically conductive material. The solvent employed dissolves the polymer so that polymer is substantially uniformly distributed on the surface of the current collector upon coating thereon. Suitable solvents include, for example, ethyl acetate, acetone, water, alcohols, and hydrocarbons. The current collector can be coated by conventional methods such as by spin coating, dipping, or painting. Once the surface is coated, the solvent is removed by evaporation, for instance, to leave an adhesion promotion layer that is attached to the surface of the current collector.

FIG. 1 illustrates an embodiment of the device suitable for fabricating an electrode that comprises a composite electrode that is attached to a current collector. The device includes spool 10 from which a continuous web or sheet of current collector material 11 is fed and spool 40 which collects the web or sheet of composite electrode/current collector assembly material 39 that is made. In between the spools are rollers 14 and 32 which direct the sheet along a path for coating the adhesive promoter layer and then the composite electrode mixture. It is understood the term "web" or "sheet" refers a continuous sheet of material that is suitable for use as a current collector.

The device further includes a reservoir 26 that contains a liquid adhesive promoter composition 28. Partially submerged in the composition 28 is roller 20 which transfers the liquid composition 28 to current collector sheet 11 as the sheet is compressed in nip 21 between pressurized rollers 20 and 24. The surface of roller 20 may have a rough texture and/or be fabricated of an absorptive material to enhance the coating of liquid adhesive promoter composition onto the surface of roller 20. Excess liquid adhesive promoter is removed with blade 17. The web or sheet of current collector 11 is preferably held with tension against the outer surface of roller 24. In this fashion, the liquid composition will be coated evenly across the web as it comes into contact with the roller 20. Sufficient tension can be created, for example, by rotating spool 40 with an effective amount of force.

Preferably, the current collector is a metal grid wherein the liquid composition will permeate through the perforations in the grid and thereby coat both sides of the current collector. As is apparent, the adhesive promoter composition should be formulated to be sufficiently viscous so as to readily adhere to the current collector surface. The spreading and drying of the composition are facilitated by air knife 30 which sends to stream of air onto the surface of coated current collector 25.

Electrode composition from source 34 is applied, e.g., extruded, onto the coated current collector 25 and blade 38 removes excess electrode composition from the coated current collector 35. An apparatus for extruding electrode material is described in U.S. Pat. No. 5,316,556 which is incorporated herein. Roller 42 may be employed to spread the electrode composition onto the current collector. In a preferred embodiment, the electrode composition requires no subsequent curing, that is, an electrode film which is attached to one side of the current collector by the adhesion promoter layer is formed upon evaporation of the solvent from the electrode composition. An electrode film can also be laminated on the second side of the current collector by the same process. Preferably, each of spools 10 and 40 and rollers 20 and 24 is motor driven to permit continuous, controlled operation. The web of electrode/current collector is cut to size and assembled into electrochemical cells and batteries.

However, prior to describing the invention in further detailed, the following terms will be defined.

The term "plasticizer" refers to an organic solvent, with limited solubility of polymers, that facilitates the formation of porous polymeric structures. By "porous structure" is meant that upon extraction of the plasticizer the polymer remains as a porous mass. Suitable plasticizers have high boiling points typically from about 100° C. to about 350° C. A number of criteria are important in the choice of plasticizer including compatibility with the components of the electrochemical cell precursor, processability, low polymer solubility and extractability liquid solvents (e.g., diethyl ether) or by supercritical fluids for example. Preferred plasticizers include, for example, dibutyl phthalate, dioctylphthalate, and acetates, glymes, and low molecular weight polymers.

In operation, for fabricating a solid polymeric matrix and composite electrode that includes polymeric binders, for example, the plasticizer is first well mixed with a polymer. Thereafter the plasticizer is removed by extraction and in the process the porous structure is formed. Preferably the weight ratio of plasticizer to polymer is from about 1 to about 50, more preferably about 10 to about 30, and most preferably about 20 to about 25.

The term "electrochemical cell precursor" or "electrolytic cell precursor" refers to the structure of the electrochemical cell prior to the addition of the inorganic salt and electrolyte solution. The precursor typically comprises (each in precursor form) an anode, a cathode, and solid polymeric matrix. The anode and/or cathode may each include a current collector. For a liquid electrolytic cell, a separator made of any suitable material such as, for example, glass fiber, polyethylene, or polypropylene is employed instead of a solid polymeric matrix.

The term "activation" refers to the placement of an electrolyte solution into the porous portions of an electrochemical cell precursor. After activation, the electrochemical cell is charged by an external energy source prior to use.

The term "electrolytic cell" or "electrochemical cell" refers to a composite containing an anode, a cathode and an ion-conducting electrolyte interposed therebetween.

The term "battery" refers to two or more electrochemical cells electrically interconnected in an appropriate series/parallel arrangement to provide the required operating voltage and current levels.

The term "solid polymeric matrix" refers to an electrolyte compatible material formed by polymerizing an organic or inorganic monomer (or partial polymer thereof) and which, when used in combination with the other components of the electrolyte, renders the electrolyte solid. Suitable solid polymeric matrices are well known in the art and include solid matrices formed from organic polymers, inorganic polymers or a mixture of organic polymers with inorganic non-polymeric materials. Preferably, the solid polymeric matrix is an organic matrix derived from a solid matrix forming monomer and from partial polymers of a solid matrix forming monomer. See, for example, U.S. Pat. Nos. 5,501,921, 5,498,491, 5,491,039, 5,489,491, 5,482,795, 5,463,179, 5,419,984, 5,393,621, 5,358,620, 5,262,253, 5,346,787, 5,340,669, 5,300,375, 5,294,501, 5,262,253, and 4,908,283, which are incorporated herein. Inorganic monomers are disclosed in U.S. Pat. Nos. 4,247,499, 4,388,385, 4,414,607, 4,394,280, 4,432,891, 4,539,276, and 4,557,985, which are incorporated herein.

The solid matrix forming monomer or partial polymer can be cured or further cured prior to or after addition of the salt, solvent and, optionally, a viscosifier. For example, a composition comprising requisite amounts of the monomer or partial polymer, salt, organic carbonate solvent and viscosifier can be applied to a substrate and then cured. Alternatively, the monomer or partial polymer can be first cured and then dissolved in a suitable volatile solvent. Requisite amounts of the salt, organic carbonate solvent and viscosifier can then be added. The mixture is then placed on a substrate and removal of the volatile solvent would result in the formation of a solid electrolyte. In either case, the resulting solid electrolyte would be a homogeneous, single phase product which is maintained upon curing, and does not readily separate upon cooling to temperatures below room temperature.

The term "substrate" refers to any suitable film made of material that is compatible with the components of the polymer mixture. The substrate serves as the vehicle or base onto which the electrode mixture is applied. After the solvent has evaporated from the mixture, the polymer matrix is formed. Suitable substrates include, for example, paper, e.g, 20 or 24 weight paper, polyester (MYLAR™), polypropylene, polyethylene films and non-woven webs.

Preferably, the solid polymeric matrix is formed by a casting process which does not require the use of monomers or prepolymers, that is, no curing is required. A preferred method employs a copolymer of vinylidenedifluoride and hexafluoropropylene dissolved in acetone or other suitable solvent(s). Upon casting the solution, the solvent is evaporated to form the solid polymeric matrix. The solution may be casted directly onto a current collector. Alternatively, the solution is casted onto a substrate, such as a carrier web, and after the solvent (e.g., acetone) is removed, an electrode film is formed thereon.

The term "salt" refers to any salt, for example, an inorganic salt, which is suitable for use in a non-aqueous electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $LiCF_3SO_3$, $LiPF_6$, $(CF_3SO_2)_2NLi$, $(CF_3SO_2)_3CLi$, $NaSCN$, and the like. The inorganic ion salt preferably contains at least one cation selected from the group consisting of Li, Na, Cs, Rb, Ag, Cu, Mg and K.

The electrolyte typically comprises from about 5 to about 25 weight percent of the inorganic ion salt based on the total weight of the electrolyte; preferably, from about 10% to 20%, and even more preferably from about 10% to about 15%. The percentage of salt depends on the type of salt and electrolyte solvent employed.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as dimethyl carbonate, diethyl carbonate, propylene carbonate, ethylene carbonate, methyl ethyl carbonate, gamma-butyrolactone, triglyme, tetraglyme, dimethylsulfoxide, dioxolane, sulfolane, and the like. When using propylene carbonate based electrolytes in an electrolytic cell with graphite anodes, a sequestering agent, such as a crown ether, is added in the electrolyte.

For electrochemical cells where (1) the cathode comprises lithiated cobalt oxides, lithiated manganese oxides, lithiated nickel oxides, $Li_xNi_{1-y}Co_yO_2$, where x is preferably about 1 and y is preferably 0.1–0.9, $LiNiVO_4$, or $LiCoVO_4$, and (2) the anode comprises carbon, the electrolytic solvent preferably comprises a mixture of ethylene carbonate and dimethyl carbonate. For electrochemical cells where the cathode comprises vanadium oxides, e.g., $V_6O_{13}$ and the anode is lithium, the electrolytic solvent preferably comprises a mixture of propylene carbonate and triglyme.

The term "organic carbonate" refers to hydrocarbyl carbonate compounds of no more than about 12 carbon atoms and which do not contain any hydroxyl groups. Preferably, the organic carbonate is an aliphatic carbonate and more preferably a cyclic aliphatic carbonate.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethy-1-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one; and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-α,β-diol (dihydroxy alkanes having hydroxyl substituents on adjacent carbon atoms) or an alkane-α,γ-diol (dihydroxy alkanes having hydroxyl substituents on carbon atoms in a 1,3 relationship) yields an a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-α,β-diol or an alkane-α,γ-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100 k, polyvinylpyrrolidone, carboxymethylcellulose, and the like. Preferably, the viscosifier is employed in an amount of about 1 to about 10 weight percent and more preferably at about 2.5 weight percent based on the total weight of the electrolyte composition.

The composite anode typically comprises a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those lithium intercalation anodes employing carbon materials such as graphite, cokes, mesocarbons, and the like. The carbon intercalation based anode precursors typically include a polymeric binder and extractable plasticizer suitable for forming a bound porous composite having a molecular weight of from about 1 k to 5,000 k. Examples of suitable polymeric binders include EPDM (ethylene propylene diamine termonomer), PVDF poly(vinylidene difluoride), HFP (hexafluoropropylene), EAA (ethylene acrylic acid copolymer), EVA (ethylene vinyl acetate copolymer), EAA/EVA copolymers, and copolymers of PVDF and HFP and the like. Other polymeric binders include, for example, polymers such as halogenated hydrocarbon polymers including, for example, poly(vinylidene chloride), poly((dichloro-1,4-phenylene)ethylene), fluorinated urethanes, fluorinated epoxies, fluorinated acrylics, and copolymers thereof.

In one preferred embodiment, the carbon intercalation anode precursor (that is, the anode structure prior extraction) comprises from about 40 to about 70 weight percent of a carbon material (e.g., graphite); from about 8 to about 20 weight percent of a polymeric binder; and from about 15 to about 40 weight percent plasticizer. The anode may also include an electron conducting material such as carbon black.

The anode active material preferably comprises graphite or coke. While both natural and synthetic graphites may be employed, synthetic graphites that are highly structured, highly crystalline, anisotropic graphites having a nearly perfect layered structure are preferred. They are preferably formed by heat treatment up to about 3000° C. Examples are the SFG™ and KS™ series of synthetic graphites from Lonza G. & T., Limited (Sins, Switzerland). A preferred natural graphite is BG 35™ from Superior Graphite Co., Chicago, Ill. Although other anode materials may be used in addition to graphite or coke, in preferred embodiments, the anode active material consists essentially of graphite, coke, or a mixture thereof. Preferred cokes include, for example, those available as MCMB 2510™ from Osaka Gas Co., Japan and MGC™ from Mitsubishi Gas Co., Japan.

The composite cathode typically comprises a cathodic material or cathode active material (i.e., insertion compound) which is any material which functions as a positive pole in a solid electrolytic cell. Such cathodic materials are well known in the art and include, by way of example, transition metal oxides, sulfides, and selenides, including lithiated compounds thereof. Representative cathodic materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$ and $LiCoVO_4$, lithiated manganese oxides, e.g., $LiMn_2O_4$, lithiated nickel oxides, e.g., $LiNiO_2$ and $LiNiVO_4$, and mixtures thereof. Cathode-active material blends of $Li_xMn_2O_4$ (spinel) is described in U.S. Pat. No. 5,429,890 which is incorporated herein. The blends can include $Li_xMn_2O_4$ (spinel) and at least one lithiated metal oxide selected from $Li_xNiO_2$ and $Li_xCoO_2$ wherein $0<x\leq2$. Blends can also include $Li_y$-α-$MnO_2$ $(0\leq y<1)$ which has a hollandite-type structure and is described in U.S. Pat. No. 5,561,007 which is incorporated herein.

In one preferred embodiment, the cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. Suitable binders for use in the cathode have a molecular weight of from about 1 k to 5,000 k.

In one preferred embodiment, the cathode is prepared from a cathode paste which comprises from about 35 to 65% of a compatible cathodic material; from about 1 to 20% of an electroconductive agent; from about 1 to 20% of suitable polymeric binders, which can be the same as those for the composite anode; from about 0 to about 20% of polyethylene oxide having a number average molecular weight of at least 100,000; from about 10 to 50% of electrolyte solvent; and from about 5% to about 25% of a solid matrix forming monomer or partial polymer thereof. Also included is an ion conducting amount of an inorganic ion salt. Generally, the amount of the salt is from about 1 to about 25%. (All weight percents are based on the total weight of the cathode.)

The electrolyte composition typically comprises from about 5 to about 25% of the inorganic ion salt based on the total weight of the electrolyte; preferably, from about 10 to 20%; and even more preferably from about 10 to about 15%. The percentage of salt depends on the type of salt and electrolytic solvent employed.

The electrolyte composition typically comprises from 0 to about 80% electrolyte solvent based on the total weight of the electrolyte; preferably from about 60 to about 80%; and even more preferably about 70%.

The electrolyte composition typically comprises from about 5 to about 30% of the solid polymeric matrix based on the total weight of the electrolyte; preferably from about 15 to about 25%.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100 k. Preferably, the film forming agent is employed in an amount of about 1 to about 10 weight percent and more preferably at about 2.5 weight percent based on the total weight of the electrolyte composition.

METHODOLOGY

Methods of fabricating electrochemical cells are known in the art. See, for example, U.S. Pat. Nos. 5,584,893, 5,300,373, 5,316,556, 5,346,385, 5,262,253, 4,472,487, 4,668,595, and 5,028,500, all of which are incorporated herein.

A feature of the present invention is that the polymeric binder (e.g., copolymer of VDF and HFP) of the composite electrode can be formed prior to being laminated onto the surface of the coated current collector. The monomers and/or prepolymers of the composite electrodes need not be cured (i.e., polymerized) after the electrode slurry has been applied onto the current collector. Rather, polymerization can occur before so that upon removal of the solvent from the anode or cathode slurry after being applied to the current collector the composite electrode is formed with no further curing (i.e., polymerization) required.

The following Examples illustrate methods of how an electrolytic cell could be fabricated with the inventive process. Examples 1 and 2 describe the process of preparing the anode and cathodes, respectively. Example 3 describes the procedures for fabricating a solid electrolytic cell.

The electrically conductive adhesion promoters for the current collectors (e.g., grids) were prepared as follows: a conductive carbon slurry was prepared separately by first adding 6 grams of conductive carbon black into 289.5 grams of ethyl acetate. The mixture was dispersed using an Eiger media-mill, using a 2 mm diameter media, rotating at 1500±200 RPM, for 10 to 30 minutes. The temperature in the Eiger mill was maintained at 21° C.±1° C. using a Nestlab refrigerated circulating bath. After the dispersion mixing the slurry as transferred to a ball mill jar and 4.5 grams of polymer was added. This mixture was ball milled for 12 hours. Cleaned and etched grids are dipped in the slurry and allowed to air dry. Average coat weight was about 0.004 grams. Alternatively, an airless sprayer can be used to spray the slurry on the grid.

The invention will be described using the anode and cathode structures wherein electrode materials (or films) are laminated onto both sides of the current collectors, however, it is understood that the invention is applicable to other configurations, for example, where only one dies of the anode and/or cathode current collector is laminated.

Current collectors for the anode and cathode can comprise, for example, a screen, grid, expanded metal, woven or non-woven or knitted wire fabric formed from an electron conductive material such as metals or alloys. Preferably, the current collector has a thickness from about 25 $\mu$m to about 75 $\mu$m, preferably about 35 $\mu$m to about 65 $\mu$m, and more preferably about 45 $\mu$m to about 55 $\mu$m. Each current collector is also connected to a current collector tab which extends from the edge of the current collector. In batteries comprising multiple electrochemical cells, the anode tabs are preferably welded together and connected to a nickel lead. The cathode tabs are similarly welded and connected to a lead. External loads can be electrically connected to the leads. Current collectors and tabs are described in U.S. Pat. Nos. 4,925,752, 5,011,501, and 5,326,653, which are incorporated herein.

EXAMPLE 1

The anode current collector employed was a sheet of expanded copper metal that is about 50 $\mu$m thick. It is available under the designation 2Cu5-125 (flatten) from Delker Corp., Branford, Conn. Both surfaces of the anode current collector are coated with the electrically conductive adhesion promoter layer. The anode slurry was prepared as follows:

A polymer mixture comprising a copolymer of vinylidenedifluoride VDF and hexafluoropropylene (HFP) was prepared by mixing 6.8 grams of the copolymer in 20 grams of acetone. The copolymer (ave. MW 125K) was Kynar Flex 2801™ from Elf Atochem North America, in Philadelphia, Pa. The mixture was stirred for about 24 hours in a milling jar available from VWR Scientific, in San Francisco, Calif., model H-04172-00. The copolymer functions as a binder for the carbon in the anode.

A graphite mixture was prepared separately by first adding 23.4 grams of BG 35™ graphite (Superior Graphite Co.) into a solution containing 60 grams acetone, and 10.5 grams dibutyl phthalate. The graphite was vigorously mixed in a high shear mixer until a substantially homogeneous blend was formed. A suitable mixer is available from Ross Model ME100DLX, Hauppauge, N.Y., operating at its highest setting (about 10,000 RPM) for 30 minutes.

The anode slurry was prepared by mixing the polymer mixture and the graphite mixture together under low shear conditions to form the anode slurry wherein the components are well mixed. A portion of the acetone is allowed to evaporate from the slurry before it was laminated onto each side of the current collector. Anode films form when the remaining portion of the acetone evaporates.

EXAMPLE 2

The cathode current collector employed was a sheet of expanded aluminum that is about 50 $\mu$m thick. The aluminum grid is available under the designation 2AL5-077 from Delker Corp. Both surfaces of the cathode current collector are coated with an electrically conductive adhesion promoter. The cathode slurry was prepared as follows:

A polymer mixture comprising a copolymer of vinylidenedifluoride (VDF) and hexafluoropropylene (HFP) was prepared by mixing 4.4 grams of the copolymer in 15 ml of acetone. The copolymer was Kynar Flex 2801™. The mixture was stirred for about 24 hours in a milling jar.

A cathode mixture was prepared separately by mixing 28.9 grams of $LiMn_2O_4$, 2.4 grams of carbon black (Super P™) into a solution containing 60 grams acetone, and 8.7 grams dibutyl phthalate. The mixture was then vigorously mixed in the a high shear mixer until a substantially homogeneous blend was formed. As further described below, the amount of cathode-active material $LiMn_2O_4$ employed can be varied to provide different cathode to anode mass ratios.

The cathode slurry was prepared by mixing the polymer mixture and the cathode mixture together under low shear conditions to form the cathode slurry wherein the components are well mixed. The surfactant can be added at any stage to achieve a cathode slurry containing the desired amount of surfactant that is well mixed therein. A portion of the acetone is allowed to evaporate from the slurry before it was laminated onto each side of the current collector. Cathode films form when the remaining portion of the acetone evaporates.

The above anode and cathode films were formed directly on the current collector by laminating the slurry mixtures onto the current collector surfaces. Alternatively, each film can be prepared by first casting a slurry onto a substrate or carrier web and allowing the solvent to evaporate thus leaving the film. Thereafter, the films can be laminated onto each side of the current collector.

EXAMPLE 3

A solid electrochemical cell is prepared by first positioning a polymeric matrix between the anode and cathode and thereafter fusing the structures under moderate pressure and temperature (e.g., 130° C.) to form an electrochemical cell precursor. The polymeric matrix is formed by casting a polymeric slurry comprising acetone, dibutyl phthalate, silanized fumed $SiO_2$, and the VDF/HFP copolymer on a suitable substrate or carrier web and allowing the acetone to evaporate. No curing by radiation is required. The $SiO_2$ is a filler which imparts toughness and strength to the film. In addition, it is believed that the $SiO_2$ assists the activation process by creating physico-chemical conditions such that the electrolyte solution quickly and completely fills the pores created by the extraction of the dibutyl phthalate. Preferably, the polymeric slurry is mixed under low shear conditions as not to degrade the copolymer.

Preferably in preparing the polymer mixture for both the anode and cathode slurries is that the polymer (or copolymer) not be subject to high shear so as to be degraded. Furthermore, preferably the polymer or copolymer employed has a high average molecular weight. Preferably the average molecular weight is between 50 K to 750 K, more preferably 50 K to 200 K, and most preferably 50 K to 120 K. Furthermore, it is preferred that polymer or copolymer has a narrow molecular weight have range. Preferably the ratio of $M_n$ to $M_w$ is equal to about 1.

Next the dibutyl phthalate plasticizer is extracted from the precursor. Extraction can be accomplished using conventional organic liquid solvents such as diethyl ether or by a dense fluid or gas which refers to a gas compressed and heated to either supercritical or subcritical conditions to achieve liquid-like densities. Dense gases and fluids are known in the art. See, for example, U.S. Pat. Nos. 5,013,366, 5,267,455, 4,219,333, 4,012,194, and 3,969,196, which are incorporated herein. A preferred dense gas is carbon dioxide. The precursor is than pre-packaged in moisture-impermeable material which is described, for example, in U.S. Pat. No. 5,326,653 which is incorporated herein, before being activated. Activation with the inventive solvent which comprises a mixture of ethylene carbonate and ethyl methyl carbonate (50:50) and $LiPF_6$ preferably occurs in an inert (e.g., argon) atmosphere. Finally, the packaging of the electrochemical cell is sealed.

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. An apparatus for continuously coating a liquid adhesive promoter composition onto a lower surface of a web of current collector material which comprises:

a source of the web of current collector material;

a reservoir containing a liquid composition that comprises a solvent, an electrically conductive solid material, and an adhesive polymer, wherein the weight ratio of the electrically conductive solid material to the adhesive polymer ranges from about 1 to 9 to 4 to 6;

a first rotatable roller having an exterior surface that is at least partially submerged in the liquid composition whereby liquid composition adheres to the exterior surface of the first rotatable roller that comes into contact with the liquid composition; and a second rotatable roller that is positioned adjacent to and above the first rotatable roller and wherein an exterior surface of the second rotatable roller and an exterior surface of the first rotatable roller defines a nip through which the web of current collector material traverses.

2. The apparatus of claim 1 wherein the web is held against an outer surface of the second roller.

3. The apparatus of claim 1 wherein said conductive material is selected from the group consisting of carbon powder, graphite and mixtures thereof.

4. The apparatus of claim 1 wherein said electrically conductive adhesion promoter comprises from about 10 to about 25 weight percent of said electrically conductive material.

5. The apparatus of claim 1 wherein said polymer is selected from the group consisting of (1) acrylics including acrylic and methacrylic acids and esters, (2) vinyls including poly(vinyl acetate), (3) polyesters, (4) polyurethanes, (5) fluoroelastomers, and mixtures thereof.

6. The apparatus of claim 5 wherein said polymer has a molecular weight of at least about 10,000.

7. The apparatus of claim 1 wherein the web comprises material that is selected form the group consisting of a screen, grid, expanded metal, woven wire fabric, non-woven fabric, and knitted wire fabric.

8. The apparatus of claim 1 wherein the web is formed from metal that is selected from the group consisting of aluminum, copper, and nickel and alloys thereof.

9. The apparatus of claim 1 wherein the weight ratio ranges from about 1.5 to 8.5 to 2.5 to 7.5.

10. The apparatus of claim 1 wherein the electrically conductive solid material is selected from the group consisting of carbon fibers, metal powders, metal coated carbon fibers, metal coated polymeric fibers, indium tin oxide, and mixtures thereof.

11. The apparatus of claim 5 wherein said polymer is a fluoroelastomer.

12. The apparatus of claim 10 wherein said polymer comprises poly(vinylidene fluoride-cohexafluoropropylene).

* * * * *